US006662009B2

(12) United States Patent
Lynn (10) Patent No.: US 6,662,009 B2
(45) Date of Patent: Dec. 9, 2003

(54) METHODS AND APPARATUS FOR PERFORMANCE TESTING OF CORDLESS TELEPHONES

(75) Inventor: Dale Everett Lynn, Freehold, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 532 days.

(21) Appl. No.: 09/735,361

(22) Filed: Dec. 12, 2000

(65) Prior Publication Data

US 2001/0031625 A1 Oct. 18, 2001

Related U.S. Application Data (60) Provisional application No. 60/177,159, filed on Jan. 20, 2000.

(51) Int. Cl.[7] .................................................. H04Q 7/20
(52) U.S. Cl. .................... 455/424; 455/425; 455/67.12; 455/67.14
(58) Field of Search ................................. 455/423, 424, 455/425, 67.11, 67.12, 67.14, 462; 370/253; 375/224

(56) References Cited

U.S. PATENT DOCUMENTS 5,467,341 A * 11/1995 Matsukane et al. ........... 370/17
5,539,803 A    7/1996 Bhat et al. .................... 379/21
5,805,667 A    9/1998 Alvarez et al. ................ 379/1

* cited by examiner

*Primary Examiner*—Lee Nguyen (57) ABSTRACT

Methods and apparatus for performance testing of an analog cordless telephone are addressed herein. A telephone base station is connected to a test controller which directs the base station to initiate a test. The test controller signals the telephone handset to transmit a plurality of test packets to the base station, each test packet being similar to an opcode used in signaling between the handset and the base station. For each test packet received, the base station passes a signal to the test controller. The test controller computes an error rate based on a difference between the number or packets received and the number of packets expected and computes communication performance between the handset and the base station based on the error rate. It is also possible to test communication performance between the base station and the handset by instructing the base station to transmit test packets to the handset and counting the test packets received by the handset, computing an error rate based on a difference between the number of received packets and the number of expected packets.

24 Claims, 6 Drawing Sheets

METHODS AND APPARATUS FOR PERFORMANCE TESTING OF CORDLESS TELEPHONES

This application claims the benefit of U.S. Provisional Application Ser. No. 60/177,159, filed Jan. 20, 2000.

FIELD OF THE INVENTION

The present invention relates generally to cordless telephony. More particularly, the invention relates to improved methods and apparatus for measuring the performance of an analog cordless telephone set.

BACKGROUND OF THE INVENTION

Cordless telephones are widely used and provide great convenience to their users. A cordless telephone provides many of the advantages of a wireless telephone, typically at a much lower cost. A cordless telephone does not provide the great mobility of a wireless telephone, but a cordless telephone user is able to use the telephone handset at some distance from the base station, and can do this simply by using his or her ordinary telephone service, which typically allows unlimited local calling for a low flat rate.

Performance of cordless telephones is affected by a number of conditions, including distance between the handset and the base station, RF conditions in the local area where the telephone is operating, and the like. It is of considerable benefit to cordless telephone users to have cordless telephones possessing signal strength performance testing characteristics. Performance information about digital telephones is often obtained by monitoring the bit error rate. Digital telephones transmit speech and other sounds by representations of digital bits. The detection of the proper arrival of bits or the failure of bits to arrive properly and the computation of a bit error rate representing the proportion of bits which fail to arrive are performed as part of the normal operation of some digital telephones and can be employed to provide performance information about these digital telephones. Transmission of speech and other sounds by means of bits and monitoring of bit error rates is not possible in analog cordless telephony and so obtaining performance information in this way is not available to users of present day analog cordless telephones.

It is possible to test the performance of an analog telephone by transmitting a test signal from the handset to the base or from the base to the handset and then using measuring instruments to monitor selected characteristics of received signal, for example, amplitude, frequency, distortion, signal to noise ratio and the like. Accomplishing this, however, requires that measuring instruments or laboratory test equipment be used. For this reason, it is difficult to provide an analog cordless telephone which is equipped to perform range testing without a need for separate instruments to measure signal quality. Instruments for measuring analog signal characteristics such as amplitude, frequency, distortion and signal to noise ratio are typically laboratory instruments and cannot feasibly be employed as functional components of analog cordless telephones. Their inclusion in a telephone would lead to a telephone having features which added greatly to cost, weight and complexity, but were not useful in the normal functioning of the telephone.

The range of the telephone is the distance at which the handset can communicate effectively with the base station, that is, at which a signal transmitted by the handset can be reliably received at the base station or a signal transmitted by the base station can be reliably received at the handset. The range of a cordless telephone is of great interest to most users. Users normally want cordless telephone systems with as great a range as possible, and they also want to know the range of the system they have or are contemplating purchasing. In prior art analog cordless telephones, range testing is accomplished by having two people go to a suitable site. One person takes the base station, while the other person takes the handset. The distance between the handset and the base station is varied, typically by having the person with the handset walk away from the base station, and performance is monitored. The range of the system is determined to be the distance at which performance becomes unacceptable.

The drawbacks of this method of range testing are obvious. First, it is inconvenient for persons at a manufacturer or repair facility to move a base station and a handset away from each other while monitoring performance in order to determine the range. Second, unless the testing personnel have some way of knowing how far away they are from one another, the range determination will only be an estimate, and may be quite inaccurate. Third, the results of such a test are not repeatable unless the test range is free of RF environmental obstructions. A digital telephone can be subjected to automatic range testing by having the handset communicate with the base station, or vice versa, and determining the bit error rate under whatever range and RF conditions are present. As noted above, the bit error rate is not available for evaluation in an analog telephone.

An analog telephone can be subjected to automatic range testing by placing the handset and base station in shielded boxes to remove the effects of environmental obstructions and other factors affecting the RF signal and allowing the base and handset to transmit and receive a test signal through sensing antennas connected via an attenuator. The signal characteristics are monitored by measuring equipment and the signal characteristics and the attenuation are employed to perform range calculations. Measuring equipment is not typically included in an analog telephone because it is not used in the normal operation of the telephone. The need for measuring equipment therefore adds to the complexity of the test system.

There exists, therefore, a need in the art for techniques for testing the performance of an analog cordless telephone which employ features used in the normal operation of the telephone to provide performance information.

SUMMARY OF THE INVENTION

Two different characteristics govern the quality of a link between the handset and base of a cordless telephone. The first characteristic is voice quality. The second characteristic is the reliability of signaling between the handset and base, that is, from the handset to the base or vice versa. Signaling is the sending of commands between the handset and the base, for example when the handset tells the base to go off hook or when the base notifies the handset of an incoming call and directs the handset to ring. Signaling in analog cordless telephones is carried out by the transmission and reception of operational code (opcode) packets which are transmitted and received by the handset and the base station as part of their normal functioning. Typically, a cordless telephone link exhibiting good signaling characteristics also exhibits good voice characteristics under the same conditions, but it is not necessarily the case that a cordless telephone link exhibiting good voice characteristics will also necessarily exhibit good signaling characteristics. This is true because the allowable FM deviation is greater for data packets than for analog voice signals. Tuning imperfections in radio receivers typically degrade reception of signals with larger FM deviation more than signals with lower FM deviation. For this reason, data packet performance provides a useful measure of both data and voice performance but voice performance does not provide a good measure of data packet performance.

One of the most important factors affecting the quality of a link between a handset and a base station is the distance between the handset and the base station, and an important characteristic of the performance of a handset and base station combination is its range, that is, the distance over which it is able to maintain a link of acceptable quality. Because the quality of a link between a base station and a handset is usually dependent on the signaling characteristics exhibited by the link, the maximum range of an analog cordless telephone, is usually dependent on the signaling range of the telephone.

A system for testing an analog cordless telephone according to one aspect of the present invention employs the creation and transmission of test packets, which are similar to opcode packets normally employed in transferring commands and status information between the base and the handset. If it is desired to test the communication performance between the handset and the base station, the handset sends a plurality of test packets to the base station, and the number of packets received is compared against the number expected to produce a handset to base station error rate characterizing the quality of the link between the handset and the base station in conveying signals transmitted from the handset to the base station. The handset to base station error rate can be compared against a predetermined criterion indicating acceptable or unacceptable performance. Similarly, if it is desired to test communication performance between the base station and the handset, the base station may send a plurality of test packets to the handset, and the number of packets received may be compared against the number expected to produce a base station to handset performance error rate. The base station to handset error rate is evaluated to determine the quality of the link between the base station and the handset. By implementing appropriate software in the telephone, it is possible to produce a numerical performance measure on an open range or in a customer's home or office environment by properly evaluating the handset to base station error rate, the base station to handset error rate or both.

When more precise testing of telephones is needed in a repair or manufacturing environment, appropriately designed cordless telephones can use these test packets to make range measurements. A cordless telephone may suitably be designed to allow control of the telephone by and reporting to a remote computer through a wired connection to a test access port on the handset and another test access port on the base station. The telephone is placed in a test environment exhibiting repeatable conditions, especially with respect to RF interference and obstructions. Such an environment may by achieved by providing a first shielded box for containing the handset and a second shielded box for containing the base station. A first sensing antenna is present in the first shielded box and a second sensing antenna is present in the second shielded box. The first and second sensing antennas are connected via an attenuator. The amount of attenuation introduced by the attenuator is calibrated to be equivalent to a specified distance.

A computer such as a personal computer (PC) is connected to the handset and the base station by a test access port on each of the handset and the base station. The test controller directs the handset to transmit a specified number of range test packets to the base station. The packets are transmitted to the first sensing antenna, attenuated, conveyed to the second sensing antenna and transmitted to the base station. The base station informs the test controller of every packet received. The test controller computes a packet error rate based on a difference between the number of packets received and the number of packets expected. The test controller uses this rate, along with the calibrated attenuation, to determine the range performance from the handset to the base. A similar test may be performed by having the base station transmit packets to the handset, with the handset informing the test controller of every packet received. The test controller then uses the packet error rate to determine range performance from the base station to the handset. It is also possible to perform iterative testing, in which a series of tests is performed with attenuation increased between tests, until the error rate exceeds some predetermined criterion.

A more complete understanding of the present invention, as well as further features and advantages of the invention, will be apparent from the following Detailed Description and the accompanying drawings.

DETAILED DESCRIPTION

Figure 1:
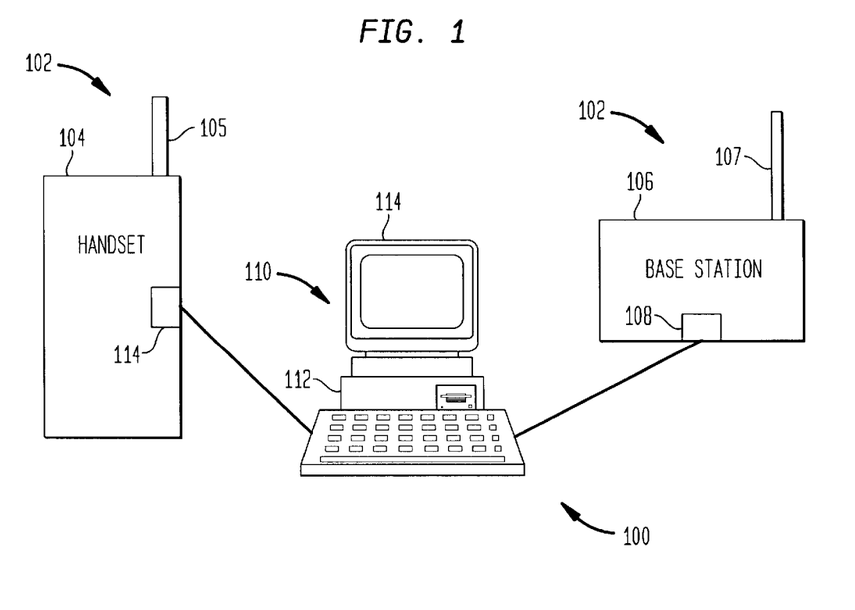
FIG. 1 illustrates a system for testing a cordless telephone according to the present invention.

FIG. 1 illustrates a test system 100 according to the present invention. The test system includes a telephone 102 comprising a handset 104 having an antenna 105 and a base station 106 having an antenna 107. The base station 106 includes a test access port 108 connected to a test controller 110. The test controller 110 is shown here as a personal computer (PC) 112 with a monitor 114, adapted to communicate with the base station 106 in order to issue commands to and receive information from the base station 106. When testing is desired, the test controller 110 communicates with the base station 106 to direct the base station 106 to enter a test mode. If a handset to base station performance test is desired, the base station 106 directs the handset 104 to transmit a series of test packets to the base station 106. The test packet is similar in structure to other opcode packets typically used by the handset 104 and base station 106. An exemplary test packet would include a preamble portion for synchronizing communication between the handset 104 and base station 106, a security code, typically 2 bytes, for determining whether the transmitting device is appropriately matched to the receiving device, and an opcode, typically 1 byte, identifying the packet as a range test packet. As the base station 106 receives each test packet, it sends a signal reporting receipt of the test packet to the test controller 110 using the test access port 108. This signal may suitably be a pulse sent to the test controller. There is no need for the test controller 110 to receive the test packet itself or a complex signal indicating receipt of the test packet. Sending a simple signal imposes a minimal computational burden on the unit sending the signal to the test controller, rather than the greater computational burden which would be imposed by sending a more complex signal. The test controller 110 counts each test packet received and compares the number of test packets against an expected number of packets. The number of packets may be predetermined, or may be determined by the test controller 110 at the start of the test. A cordless handset or base station typically responds to an opcode packet which contains errors by ignoring the opcode packet. The test packets, as noted above, are similar in structure to opcode packets typically used in signaling between handsets and base stations. Therefore, the base station 106 will ignore each test packet which contains errors and will not pass the test packet to the test controller 110. The test controller 110 will thus receive only test packets which are received free of errors.

The test controller 110 computes an error rate based on the number of packets received versus the number of packets expected and uses the error rate to evaluate handset to base performance.

If it is desired to test the performance of the link between the base station 106 and the handset 104, the handset 104 may be connected to the test controller 110 by means of a test access port 114. The test controller 110 then instructs the handset 104 to initiate a test and the handset 104 instructs the base station 106 to transmit a plurality of test packets. For each test packet received, the handset 104 sends a signal to the test controller 110 reporting receipt of the test packet. The test controller 110 compares the number of received packets against the number of expected packets, computes the error rate and evaluates base to handset performance.

Alternatively, the test controller 110 can directly control transmission of packets by the transmitting unit and can directly receive signals from the receiving unit reporting received packets. Connecting both units to the test controller 110 also allows the test controller 110 a high degree of control over the testing process. For example, the test controller 110 may issue repeated instructions for the handset 104 to send a single packet and may receive a signal as each packet arrives at the base station 106. Similarly, the test controller 110 may command repeated transmission of single packets by the base station 106 and may then receive a signal as each packet arrives at the handset 104. This allows the test controller 110 to react appropriately to each failure of a test packet to arrive properly, without waiting to collect results from transmission of a plurality of test packets. In addition, allowing the test controller 110 to direct each individual transmission and reception of a test packet minimizes the computational load on the handset 104 and base station 106. In such an implementation, neither the handset 104 nor the base station 106 is required to instruct the other unit to transmit packets, nor is either unit required to keep count of the packets it is transmitting. The handset 104 and base station 106 need only transmit and receive individual packets in response to individual commands from the test controller 110. The handset 104 and base station 106 thus require little or no additional circuitry beyond the test access ports in order to allow for testing, because the test controller 110 carries nearly the entire computational load presented by testing.

It is also possible to design a cordless telephone to perform testing without a need for a test controller by adding additional computational resources to the telephone in order to allow the handset, the base station or both to count received test packets and compute and evaluate the error rate. By adding additional computational circuitry and accepting a somewhat increased cost of manufacture, it is possible to provide a telephone wherein the telephone components can count test packets and evaluate the error rate, without a need to connect one or more of the telephone components to a test controller.

Figure 2:
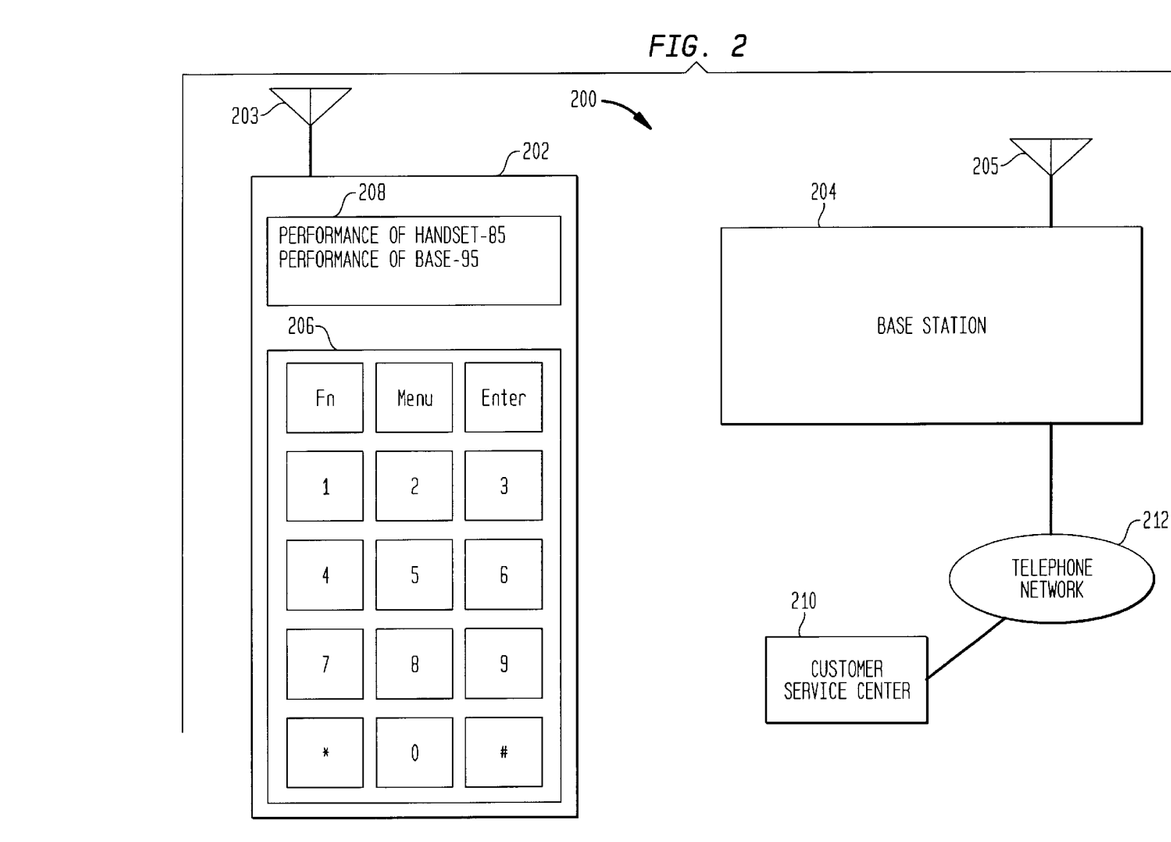
FIG. 2 illustrates a cordless telephone adapted for performance testing according to the present invention.

FIG. 2 illustrates a telephone 200 according to an alternative aspect of the present invention. The telephone 200 includes a handset 202 and base station 204. The handset 202 includes a handset antenna 203 and the base station 204 includes a base station antenna 205. The handset 202 includes a keypad 206 and a display 208. The display 208 is employed to provide performance indications and may be an LCD display as shown here, or may be an alternative display such as an LED which is dark when performance is unsatisfactory and illuminated when performance is acceptable.

When the user presses a predefined sequence of keys on the keypad 206, the telephone 200 enters a test mode. The handset 202 notifies the base station 204 that a test is in progress and sends a series of test packets to the base station 204. The base station 204 receives the test packets and counts the test packets successfully received, comparing them against an expected number of packets. The number of packets may be predetermined, or may be transmitted by the handset at the start of the test. The base station 204 computes an error rate based on the number of packets received versus the number of packets expected and uses the error rate to evaluate handset to base performance. The base station 204 then transmits a series of test packets to the handset 202, which computes an error rate and uses the error rate to evaluate base to handset performance. The handset 202 displays performance results using the display 208. If desired, the test can be repeated continuously until stopped by the user, so that the user can move the handset to various locations and evaluate performance in each location. This feature assists in placing the base station 204, because the base station 204 can be placed in different locations and then performance testing accomplished at different locations in which it may be desired to use the handset. It should be noted that it is not necessary to test handset to base and base to handset performance every time testing is done. If desired, the telephone 200 may be designed to allow the user to select handset to base performance testing when desired by pressing a first key sequence and base to handset performance when that is desired by pressing a second key sequence. A third key sequence may be pressed to select handset to base and base to handset performance.

It is also possible to employ the telephone 200 to perform testing under the direction of a customer service center 210 connected to the telephone 200 through a telephone network 212. In cases in which a user notices that performance is degraded, for example, if the user is experiencing static or a low signal level, the user may call the customer service center 210. In order to determine that the handset 202 and base station 204 are transmitting and receiving signals properly, the handset 202 and base station 204 can perform testing under the control of the customer service center 210. The customer service center 210 directs the base station 204 to initiate the sending of test packets. The base station 204 sends range test packets to the handset 202 if testing performance testing from the base to the handset is desired, or alternatively directs the handset 202 to send packets to the base station 204 if performance testing from the handset to the base is desired. In either case, the number of packets expected is either a predetermined number or a number chosen by the customer service center 210. The base station 204 reports the number of packets received to the customer service center 210. The customer service center 210 compares the number of packets received with the number of packets expected and computes the error rate. The customer service center 210 can then use the error rate to evaluate the performance of the telephone and advise the user of corrective actions which need to be taken. Personnel at the customer service center 210 can request that the user assist in testing, for example, moving the handset 202 farther away from the base station 204 and then allowing the customer service center 210 to direct performance of another test. The customer service center 210 can use data obtained from testing to diagnose defects in the telephone 200 and isolate defects to the handset 202 or the base station 204. For example, if the telephone has good packet error performance in one direction by poor packet error performance in the opposite direction, that would suggest a problem with the telephone because designers normally strive for symmetric performance.

Figure 3:
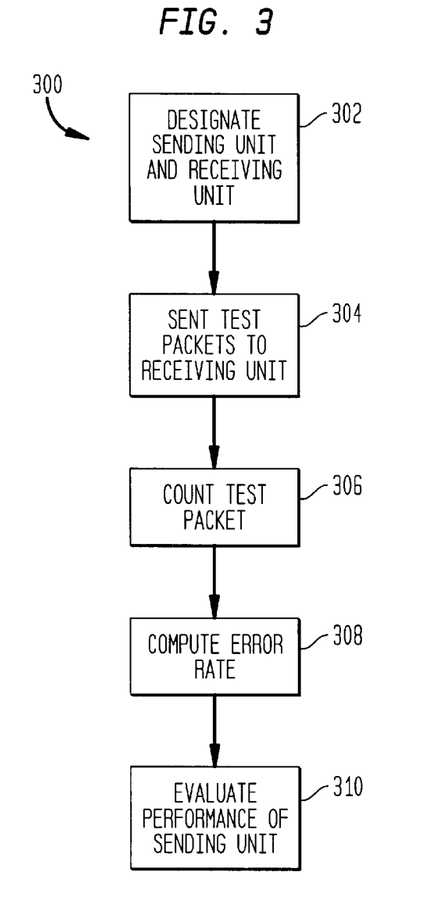
FIG. 3 illustrates a process of performance testing of a cordless telephone according to the present invention.

FIG. 3 illustrates a process of performance testing 300 of an analog cordless telephone. The telephone may suitably be a telephone such as the telephone 200, including a handset such as the handset 202 and a base station such as the base station 204 illustrated in FIG. 2. At step 302, one of the handset or the base station is designated as a transmitting unit and the other of the handset and the base station is designated as a receiving unit. At step 304, a plurality of test packets is sent from the sending unit to the receiving unit. At step 306, the received test packets are counted. At step 308, an error rate is computed based on a difference between the number of test packets received and the number of test packets expected. At step 310, the performance of the sending unit in transmitting to the receiving unit is evaluated by comparing the error rate against predetermined criteria.

It will be clear that the performance of the handset and the base station can be evaluated using the process of step 300 by simply performing the process 300 with the handset designated as the sending unit and the base station designated as the receiving unit and then performing the process again with the base station designated as the sending unit and the handset designated as the receiving unit.

Figure 4:
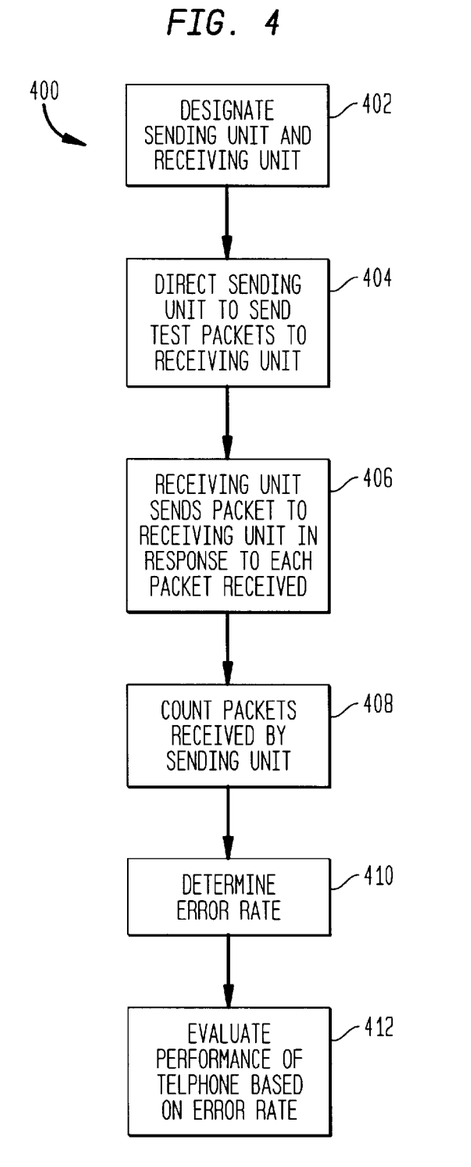
FIG. 4 illustrates an alternative process of performance testing of a cordless telephone according to the present invention, showing testing of both the handset to base station link and the base station to handset link in a combined test.

It is also possible to test the radio link from the handset to the base station and vice versa by directing the receiving unit to send a test packet back to the sending unit whenever a test packet is received. FIG. 4 illustrates an alternative process of testing 400 according to an alternative aspect of the present invention. At step 402, in response to a selection to test the handset to base station performance or the base station to handset performance, either the handset or the base station is designated as the receiving unit and the other component is designated as the sending unit. At step 404, the sending unit is directed to transmit a specified number of test packets to the receiving unit. At step 406, the receiving unit reports each successful receipt of a test packet and also transmits a test packet of its own to the sending unit. At step 408, the sending unit reports each successful receipt of a range test packet. At step 410, the total number of test packets received by the sending unit is compared against the total number of test packets sent to the receiving unit and an error rate is determined based on the difference between the number of sent packets and the number of received packets. At step 412, the error rate is compared against a predetermined criterion to determine if the performance of the telephone is acceptable. It will be noted that the number of test packets received by the sending unit will be less than or equal to the number of packets sent by the sending unit, because a packet must be successfully received by the receiving unit in order for the receiving unit to send a packet, and then the sending unit must successfully receive the packet sent by the receiving unit. Counting the number of packets received by the sending unit will indicate whether or not the sending unit and the receiving unit, considered together, are performing to a desired standard.

In a production, test or repair environment it will often be desirable to use additional equipment in order to simulate an RF environment having predetermined characteristics in order to allow for precise and repeatable performance measurements.

Figure 5:
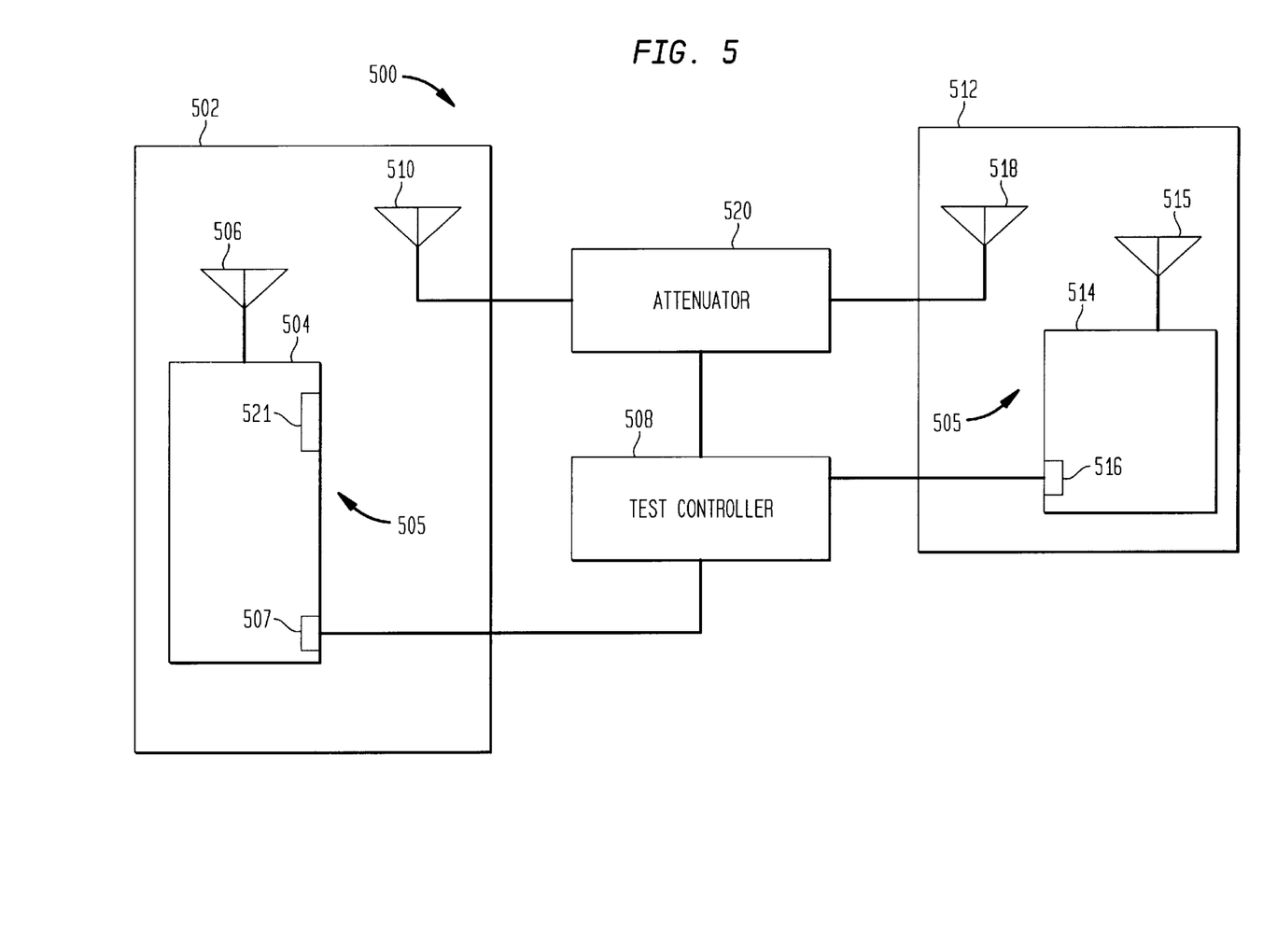
FIG. 5 illustrates a cordless telephone range test system according to the present invention.

FIG. 5 illustrates a cordless telephone performance test system 500 according to an alternative aspect of the present invention. The system 500 comprises a first shielded enclosure 502, illustrated here as enclosing a handset 504 of a cordless telephone 505 which is to be tested. The first enclosure 502 may suitably be a shielded box made of copper and lined with conductive foam. The handset 504 includes a handset antenna 506 and a test access port 507 for connecting to a test controller 508 and receiving commands from and transferring data to the test controller 508. The test controller 508 may suitably be a PC. The first enclosure 502 also encloses a first sensing antenna 510. The system 500 also includes a second shielded enclosure 512, illustrated here as enclosing a base station 514 to be tested along with the handset. The base station 514 includes a base station antenna 515 and a test access port 516 for connecting to the test controller 508 and receiving commands from and transferring data to the test controller 508. The second enclosure also encloses a second sensing antenna 518. The first sensing antenna 510 appears to the handset 504 as the antenna 515 of the base station, while the second sensing antenna 518 appears to the base station 514 as the antenna 506 of the handset 504. The first and second sensing antennas 510 and 518 are connected via an attenuator 520. The attenuator is calibrated to provide an attenuation equivalent to a specified range or distance between the handset 504 and the base station 514.

When it is desired to test transmission performance between the handset 504 and the base station 514, the test controller 508 directs the handset 504 to transmit a specified number of range test packets to the base station 514. The energy transmitted by the handset 504 is detected by the first sensing antenna 510 and passed through the attenuator 520 to the second sensing antenna 518. The energy received by the second sensing antenna 518 is then transmitted to the base station 514, which detects some or all of the range test packets. As the base station 514 receives each range test packet, it transmits a signal confirming receipt of the test packet to the test controller 508 and the test controller 508 increments a count of received test packets. Once all packets have been transmitted, the test controller 508 compares the number of packets transmitted with the number received and determines the error rate represented by the difference. The test controller 508 then uses the packet error rate and the distance represented by the attenuation to predict the range performance of the handset 504 to the base station 514, and may also compute other characteristics of the transmission performance between the handset 504 and the base station 514.

A similar procedure may be employed to determine the range or other performance characteristics from the base station 514 to the handset 504, by instructing the base station 514 to transmit packets to the handset 504 and having the handset 504 send signals to the test controller 508 reporting receipt of packets. The test controller 508 would then compute the range performance or other performance characteristics of the handset 504 to the base station 514 using the packet error rate and the distance represented by the attenuation. To determine the effective range of the telephone, both base to handset and handset to base ranges would be determined, with the shorter of the two ranges being the effective range of the telephone.

It is also possible to use the system 500 of FIG. 5 in an iterative testing process. The attenuator 520 is set to a predetermined initial value, the handset 504 or base station 514 is directed to transmit packets, and the number of packet errors is compared to a predetermined criterion. If the number of packet errors falls below the predetermined criterion, the attenuator 520 is adjusted either manually or as directed by the test controller 508 to provide an increased attenuation and the test is repeated until the number of packet errors exceeds the predetermined criterion. Such a testing procedure can be used to establish a performance table for a telephone, showing error rates at a variety of ranges corresponding to attenuation levels employed during testing.

As an alternative to controlling testing using a test controller 508, it is possible to design the handset 504 and base station 514 to implement range testing independently of a test controller. In such a test, a predetermined key sequence would be entered by the user to direct initiation of a test. In response, the handset 504 would transmit a predetermined number of range test packets. Upon receiving a range test packet, the base station 514 would know that a range test was being conducted, and would expect to receive a predetermined and known number of range test packets. The base station 514 compares the number of received packets against the number of detected packets and performs range determination based on the error rate and the attenuation.

Figure 6:
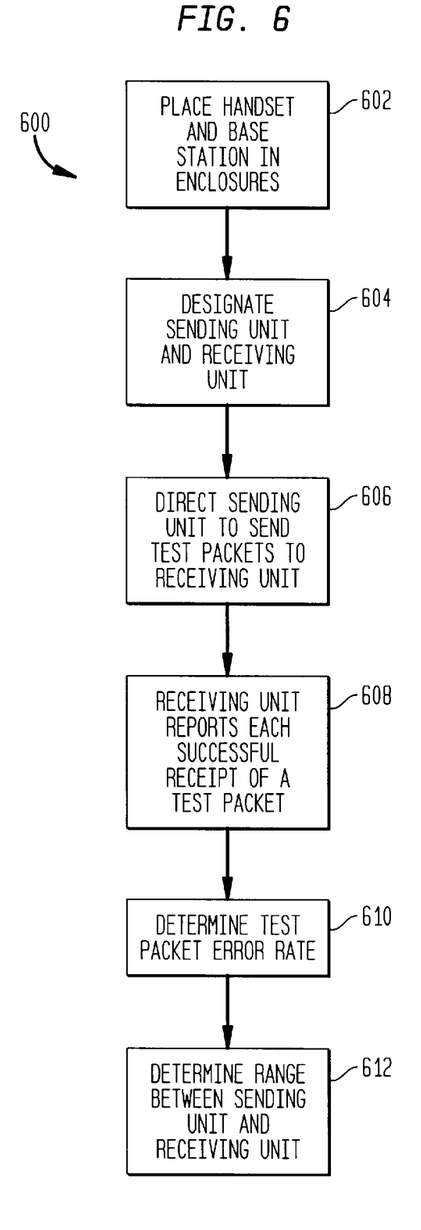
FIG. 6 illustrates a process of cordless telephone range testing according to the present invention.

FIG. 6 illustrates a process of range testing 600 according to the present invention. At step 602, a cordless telephone handset is placed in a first shielded enclosure and a cordless telephone base station matching the handset is placed in a second shielded enclosure. The first and second shielded enclosures may suitably be similar to the first and second enclosures 502 and 512 of FIG. 5. The first enclosure includes a first sensing antenna and the second enclosure includes a second sensing antenna. The first and second sensing antennas are connected via an attenuator set to provide a level of attenuation equivalent to a specified distance. The cordless telephone handset and base station are preferably similar to the handset 504 and base station 514 of FIG. 5, and each include a test access port to allow communication with a test controller. At step 604, in response to a selection to test the handset or the base station, either the handset or the base station is designated as the receiving unit and the other component is designated as the sending unit. At step 606, the sending unit is directed to transmit a specified number of range test packets to the receiving unit. At step 608, the receiving unit reports to a test controller each successful receipt of a range test packet. At step 610, the number of successfully received range test packets is compared against the number of packets sent and an error rate determined based on the difference between the number of sent packets and the number of received packets. At step 612, an effective range from the sending unit to the receiving unit is determined based on the error rate and the level of attenuation.

Figure 7:
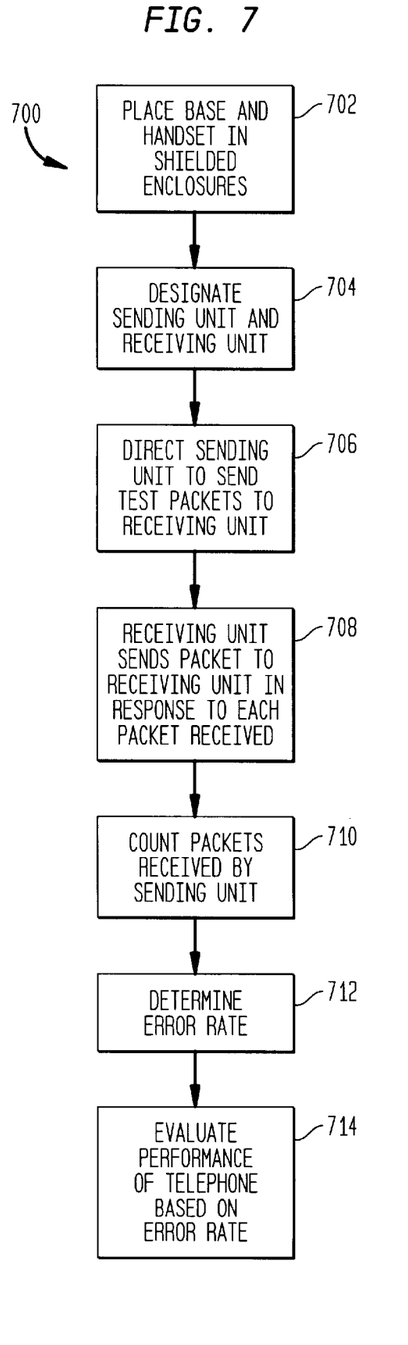
FIG. 7 illustrates an alternative process of cordless telephone range testing according to the present invention.

FIG. 7 illustrates an alternative process of range testing 700 according to another aspect of the present invention. At step 702, a cordless telephone handset is placed in a first shielded enclosure and a cordless telephone base station matching the handset is placed in a second shielded enclosure. The first enclosure contains a first sensing antenna and the second enclosure contains a second sensing antenna. The first and second sensing antennas are connected via an attenuator. At step 704, in response to a selection to test the range of transmissions from the handset to the base station or from the base station to the handset, either the handset or the base station is designated as the receiving unit and the other component is designated as the sending unit. At step 706, the sending unit is directed to transmit a specified number of range test packets to the receiving unit. At step 708, in response to each successful reception of a test packet, the receiving unit transmits a range test packet of its own to the sending unit. At step 710, the range test packets received by the sending unit are counted. At step 712, an error rate is computed based on the difference between the number of test packets sent by the sending unit and the number of test packets received by the sending unit. At step 714, an effective range for the telephone is determined based on the error rate and the level of attenuation.

Figure 8:
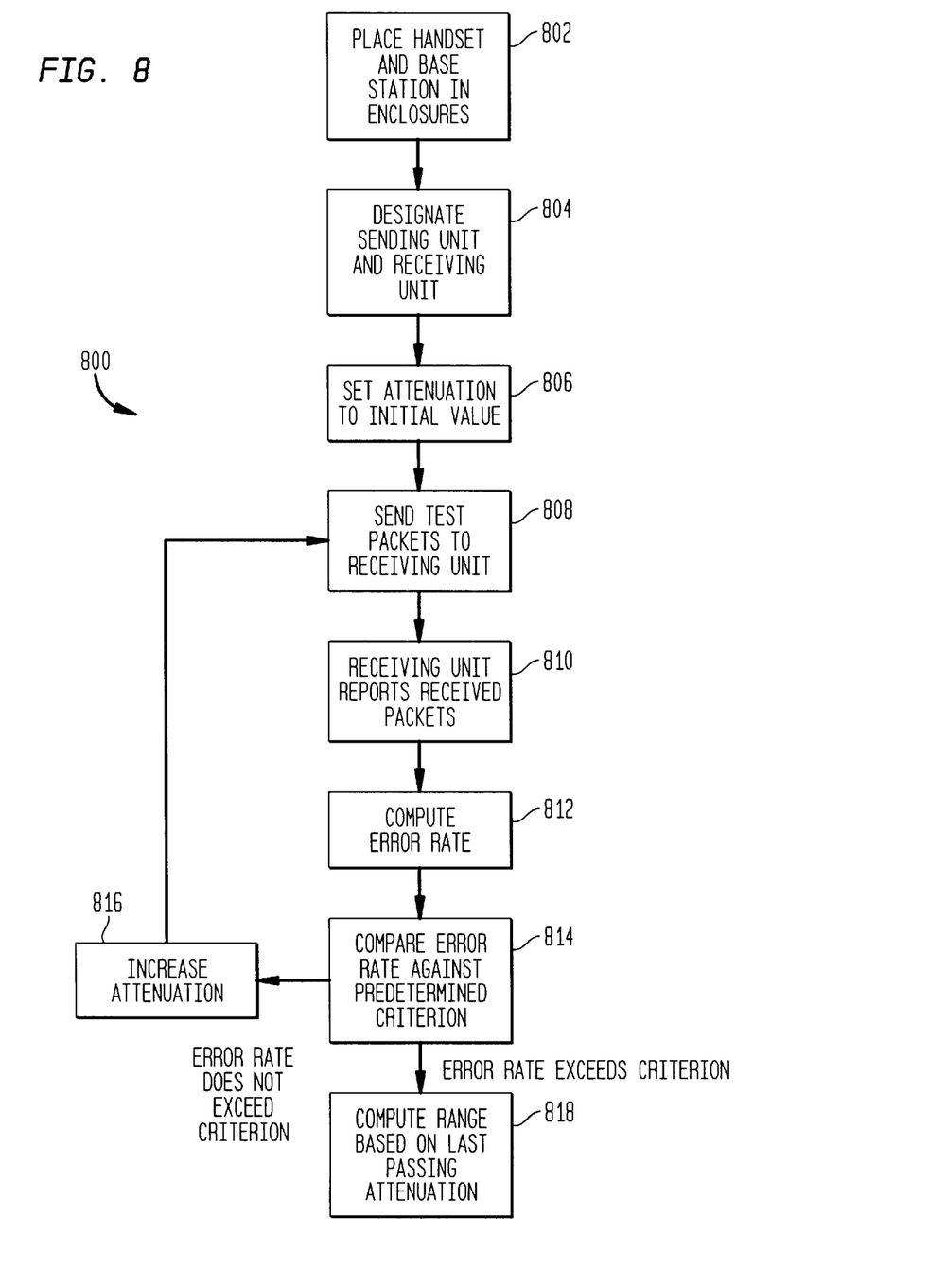
FIG. 8 illustrates a further alternative process of cordless telephone range testing according to the present invention.

FIG. 8 illustrates an alternative process of range testing 800 according to an alternative aspect of the present invention. At step 802, a cordless telephone handset is placed in a first shielded enclosure and a cordless telephone base station matching the handset is placed in a second shielded enclosure. The first and second shielded enclosures may suitably be similar to the first and second enclosures 502 and 512 of FIG. 5. The first enclosure includes a first sensing antenna and the second enclosure includes a second sensing antenna. The first and second sensing antennas are connected via an attenuator set to provide a level of attenuation equivalent to a specified distance. The cordless telephone handset and base station are preferably similar to the handset 504 and base station 514 of FIG. 5, and each may suitably include a test access port to allow communication with a test controller. At step 804, in response to a selection to test the handset or the base station, either the handset or the base station is designated as the receiving unit and the other component is designated as the sending unit. At step 806 an initial attenuation is set. At step 808, the sending unit is directed to transmit a specified number of range test packets to the receiving unit. At step 810, the receiving unit reports each successful receipt of a range test packet. At step 812, the number of successfully received range test packets is compared against the number of packets sent and an error rate determined based on the difference between the number of sent packets and the number of received packets. At step 814, the error rate is compared against a predetermined criterion indicating the maximum allowable error rate representing acceptable performance. If the error rate does not exceed the predetermined criterion, the process proceeds to step 816 and the attenuation is increased by a predetermined amount. The process then returns to step 808. If the error rate exceeds the predetermined criterion, the process proceeds to step 818, an effective range from the sending unit to the receiving unit is determined based on the highest level of attenuation at which the error rate did not exceed the predetermined criterion.

While the present invention is disclosed in the context of a presently preferred embodiment, it will be recognized that a wide variety of implementations may be employed by persons of ordinary skill in the art consistent with the above discussion and the claims which follow below.

I claim:

1. A system for automated performance testing of an analog cordless telephone, comprising:

a handset for communicating with a matching base station, the handset including a handset test access port, the handset being operative to transmit a test packet to the base station in response to an instruction received via the handset test access port, the test packet comprising an opcode similar to opcodes used for signaling between the handset and the base station;

a base station for communicating with the handset, the base station being operative to receive the test packet and output a signal indicating receipt of a packet by the base station to a base station test access port if the base station properly received the test packet, the base station being operative to ignore the test packet if the test packet was improperly received; and a test controller for connecting to the handset test access port and the base station test access port, the test controller being operative to issue an instruction to the handset test access port to direct the handset to transmit a test packet to the base station, the test controller being operative to read the signal indicating receipt of the packet by the base station from the base station test access port and to note whether the test packet was received, the test controller being further operative to evaluate communication performance between the handset and the base station based on whether the test packet was received.

2. The system of claim 1 wherein the base station is operative to transmit a test packet to the handset in response to an instruction received from the test access port, the handset is operative to receive the test packet and output a signal indicating receipt of the test packet by the handset to the handset test access port if the test packet was properly received and ignore the test packet if the test packet was not properly received, and wherein the test controller is operative to transmit an instruction to the base station test access port to direct the base station to transmit a test packet to the handset, the test controller being operative to read the signal indicating receipt of the test packet by the handset from the handset test access port and to note whether the test packet was received, the test controller being further operative to evaluate communication performance between the handset and the base station based on whether the test packet was received.

3. The system of claim 2 wherein the test controller is operative to transmit multiple instructions to transmit test packets, each instruction to transmit a test packet being followed by a reception of a signal indicating receipt of the test packet, and wherein the test controller is operative to compute an error rate based on a difference between the number of received test packets and a number of transmitted test packets and to evaluate communication performance between the sending unit and the receiving unit based on the error rate.

4. A system for automated performance testing of an analog cordless telephone, comprising:

a handset for communicating with a matching base station, the handset being operative to transmit a plurality of test packets to the base station, the test packets comprising opcodes similar to opcodes used for signaling between the handset and the base station;

a base station for communicating with the handset, the base station being operative to receive the plurality of test packets and output a signal indicating receipt of each properly received test packet to a test access port; and a test controller adapted to connect to the test access port of the base station, the test controller being operative to count signals received from the test access port, to compute an error rate based on a difference between the number of signals received and signals expected and to evaluate communication performance between the handset and the base station based on the error rate.

5. The system of claim 4 wherein the test controller is operative to instruct the base station to conduct a test and wherein the base station is operative upon receiving the instruction from the test controller to instruct the handset to transmit the test packets.

6. The system of claim 5 wherein the base station is also operative to transmit a plurality of test packets to the handset, wherein the handset is operative to output each received test packet to a test access port and wherein the test controller is operative to count the test packets received by the handset, to compute an error rate based on a difference between the number of packets received and the number of packets expected and to evaluate communication performance between the base station and the handset based on the error rate.

7. An analog cordless telephone adapted for automated performance testing, comprising:

a handset for communicating with a matching base station, the handset being operative to perform a handset to base station test, the handset being operative upon initiation of the handset to base station test to inform the base station that a test is being conducted and that a plurality of test packets comprising a specified number of test packets is being transmitted and to transmit the plurality of test packets to the base station, the test packets comprising opcodes similar to opcodes used for signaling between the handset and the base station; and a base station for communicating with the handset, the base station being operative to receive the plurality of test packets and count the test packets properly received, the base station being further operative to determine an error rate based on a difference between the number of test packets received and the specified number of test packets, the base station being further operative to evaluate communication performance between the handset and the base station based on the error rate.

8. The telephone of claim 7 wherein the base station is operative to perform a base station to handset test, the base station being operative upon initiation of the base station to handset test to inform the handset that a test is being conducted and that a plurality of test packets comprising a specified number of test packets is being transmitted to the handset and to transmit the plurality of test packets to the handset, and wherein the handset is operative to receive the plurality of test packets and count the test packets properly received, the handset being further operative to determine an error rate based on a difference between the number of test packets received and the specified number of test packets, the handset being further operative to evaluate communication performance between the base station and the handset based on the error rate.

9. The telephone of claim 8 wherein the handset includes a display for indicating performance evaluations of the handset in transmitting to the base station.

10. The telephone of claim 9 wherein the display also indicates performance evaluations of the base station in transmitting to the handset.

11. The telephone of claim 10 wherein the base station is operative to communicate with a customer service center over a telephone network and wherein the base station is operative to receive test instructions from the customer service center, the base station being operative to designate one of the handset and the base station as a sending unit and the other of the handset and the base station as a receiving unit depending on instructions received from the customer service center, wherein the base station directs a specified number of test packets to be sent from the sending unit to the receiving unit in response to instructions from the customer service center, and wherein the base station is operative to report the number of test packets properly received to the customer service center to allow the customer service center to compute an error rate and to evaluate the performance of the sending unit to the receiving unit based on the error rate.

12. The system of claim 8 wherein the handset is operative to initiate a handset to base station test upon receiving a first predetermined sequence of keypresses.

13. The system of claim 8 wherein the handset is operative to direct the base station to perform a base station to handset test upon receiving a second predetermined sequence of keypresses.

14. A system for range testing of a cordless telephone, comprising:
   a first shielded enclosure for enclosing a cordless telephone handset, the first shielded enclosure containing a first sensing antenna;
   a second shielded enclosure for enclosing cordless telephone base station, the second shielded enclosure containing a second sensing antenna;
   an attenuator connected between the first sensing antenna and the second sensing antenna, the attenuator adapted to introduce a predetermined attenuation equivalent to a specified distance;
   the cordless telephone handset, the handset being adapted for designation as a sending unit or a receiving unit, the handset being adapted to transmit a plurality of range test packets to the base station when designated as the sending unit, the handset being adapted to receive a number of range test packets from the base station and to report each successful receipt of a range test packet when designated as the receiving unit;
   the cordless telephone base station, the base station being adapted for designation as a sending unit or a receiving unit, the base station being adapted to transmit a plurality of range test packets to the handset when designated as the sending unit, the handset being adapted to receive a number of range test packets from the handset and to report each successful receipt of a range test packet when designated as the receiving unit; and
   a range calculator adapted to compute the range performance between the sending unit and the receiving unit based on an error rate comprising a difference between the number of range test packets sent by the sending unit and the number of range test packets received by the receiving unit, and a distance equivalent to the attenuation introduced by the attenuator.

15. The system of claim 14, wherein each of the handset and the base station includes a test access port and wherein the system further includes a test controller adapted to communicate with each of the handset and the base station through the test access ports, the test controller being adapted to designate one of the handset and the base station as the sending unit and the other of the handset and the base station as the receiving unit, the test controller being adapted to direct sending of range test packets to the sending unit and to receive reports of receipt of range test packets by the receiving unit, the test controller being further adapted to compute the error rate and to calculate the range between the sending unit and the receiving unit.

16. The system of claim 15 wherein the test controller is a personal computer.

17. The system of claim 16 wherein the receiving unit is operative to send a range test packet to the sending unit after each receipt of a range test packet from the sending unit, wherein the sending unit is operative to report each receipt of a range test packet from the receiving unit, and wherein the test controller is operative to determine the range performance from the receiving unit to the sending unit based on an error rate based on the number of range test packets sent from the receiving unit to the sending unit and the number of range test packets received from the receiving unit by the sending unit.

18. The system of claim 14 wherein the handset is adapted to receive a designated sequence of keypresses ordering initiation of a handset to base station test sequence, the handset being adapted to designate the handset as the sending unit and the base station as the receiving unit upon initiation of the handset test sequence, to notify the base station of initiation of the handset test sequence and to send a series of range test packets to the base station, and wherein the base station is adapted to receive the range test packets and furnish a report of successful receipt of the range test packets to the handset, and wherein the handset is further adapted to receive the report from the base station, to compute the error rate based on the report and to compute the range based on the error rate and the attenuation.

19. The system of claim 14 wherein the handset is adapted to receive a designated sequence of keypresses ordering initiation of a base station to handset test sequence, the handset being adapted to designate the base station as the sending unit and the handset as the receiving unit upon initiation of the base station test sequence, to notify the base station of initiation of the base station test sequence and to direct the base station to send a series of range test packets to the handset, wherein the base station is adapted to send the range test packets and wherein the handset is further adapted to receive the range test packets, to compute the error rate based on the number of packets received versus the number of packets sent and to compute the range performance based on the error rate and the attenuation.

20. A method of range testing for an analog cordless telephone, comprising the steps of:
   (1) enclosing a cordless telephone handset within a first shielded enclosure, the first shielded enclosure also containing a first sensing antenna;
   (2) enclosing a cordless telephone base station within a second shielded enclosure, the second shielded enclosure also containing a second sensing antenna, the second sensing antenna being connected to the first sensing antenna through an attenuator, the attenuator having an attenuation set to be equivalent to a specified distance;
   (2) designating one of the cordless telephone handset and the cordless telephone base station as a sending unit and the other of the handset and the base station as a receiving unit;
   (3) sending a plurality of range test packets from the sending unit to the receiving unit;
   (4) detecting each reception of a range test packet by the receiving unit; and
   (5) computing an error rate based on a difference between the number of range test packets sent from the sending unit and the number of range test packets received by the receiving unit; and (6) computing range performance from the sending unit to the receiving unit based on the error rate and the attenuation.

21. The method of claim 20 wherein step (6) is followed by a step of comparing the error rate to a predetermined maximum acceptable error rate, adjusting the attenuation and returning to step (3) if the error rate does not exceed the predetermined maximum and, if the error rate does exceed the predetermined maximum, designating the range performance as the last distance equivalent to the attenuation present when the error rate did not exceed the predetermined maximum.

22. An analog cordless telephone adapted for range testing, comprising:
- a handset adapted for placement in a first shielded enclosure, the first shielded enclosure also enclosing a first sensing antenna, the handset being adapted to transmit a plurality of range test packets to the first sensing antenna;
- a base station adapted for placement in a second shielded enclosure, the second shielded enclosure also enclosing a second sensing antenna, the first and second sensing antennas being connected via an attenuator adapted to introduce an attenuation equivalent to a predetermined distance, the base station being adapted to receive a plurality of range test packets from the second sensing antenna, the base station being further adapted to report a number of range test packets successfully received in order to allow computation of an error rate based on a difference between the number of packets sent from the handset and the number of packets received by the base station, the error rate allowing computation of a maximum allowable range between the handset and the base station based on the error rate and the attenuation.

23. The telephone of claim 22 wherein each of the handset and the base station includes a test access port to allow receiving of commands from and transmission of information to a test controller.

24. The telephone of claim 23 wherein the handset is also adapted to receive range test packets from the base station and wherein the base station is adapted to send range test packets to the handset, each of the handset and the base station being adapted for designation as a sending unit or a receiving unit, the sending unit sending range test packets and the receiving unit receiving range test packets, and wherein the error rate is computed based on numbers of range test packets sent from the sending unit and received by the receiving unit, and wherein the maximum allowable range is the maximum allowable range between the sending unit and the receiving unit.

* * * * *